Dec. 3, 1968 R. DAHLBERG 3,414,784
ELECTRICAL STRUCTURAL ELEMENT HAVING CLOSELY NEIGHBORING TERMINAL CONTACTS AND METHOD OF MAKING IT
Original Filed Aug. 6, 1958
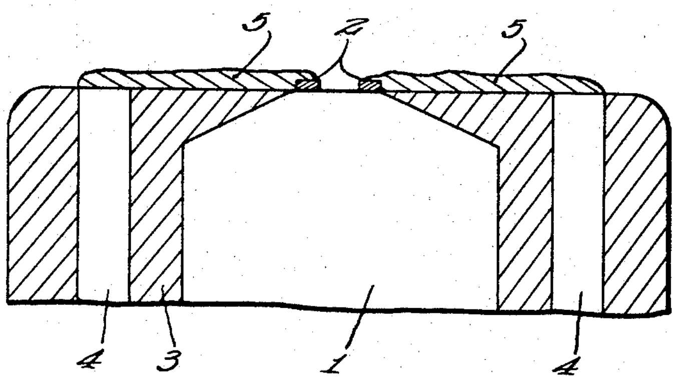
INVENTOR.
Reinhard Dahlberg
BY Spice & Spice ATTORNEYS United States Patent Office 3,414,784
Patented Dec. 3, 1968

3,414,784
ELECTRICAL STRUCTURAL ELEMENT HAVING CLOSELY NEIGHBORING TERMINAL CONTACTS AND METHOD OF MAKING IT

Reinhard Dahlberg, Munich, Germany, assignor to Siemens Aktiengesellschaft, Munich, Germany, a corporation of Germany Continuation of application Ser. No. 753,565, Aug. 6, 1958. This application Dec. 8, 1966, Ser. No. 600,245
Claims priority, application Germany, Sept. 27, 1957, S 55,311
4 Claims. (Cl. 317—235)

ABSTRACT OF THE DISCLOSURE

An electrical device such as a transistor which has a semi-conductor body formed with two parts with the second part extending from the first part and having a smaller cross-sectional area than the first part and with the first and second body portions covered by insulated material except for the top surface of the second body portion. Electrodes are formed on the edges of the top surface of the second body portion and conductors extend through the insulating material. Conductive coating is formed of layers which extend between respective conductors and with respective electrodes on the second body portion so as to form a compact and efficient transistor device.

This application is a continuation of application Ser. No. 753,565, filed Aug. 6, 1958, now abandoned.

This invention is concerned with an electrical structural device or element, for example, a transistor having a semiconductor body provided with closely spaced electrodes, and with a method of making it.

It is in connection with some transistors necessary to provide leads for interconnection with very small electrodes having linear dimensions on the order of 20–40 microns and spaced apart by about 20 microns.

The soldering of wires to such terminals is technologically difficult and does not necessarily produce electrically and mechanically stable connections. This also applies to contact points, for example, the so-called whiskers, to be connected with the electrodes.

The invention avoids these drawbacks by embedding the semi-conductor body in an insulating mass but leaving the contact surfaces of the electrodes at least partially free, and further providing upon the insulating mass electrically conductive layers connecting with the contact surfaces of the electrodes.

The various objects and features of the invention will appear from the description of an embodiment which is rendered below with reference to the accompanying drawing.

Referring to the drawing, numeral 1 indicates a semiconductor body made for example of germanium, and having two electrodes 2 alloyed thereto. One of the electrodes may, for example, consist of aluminum and the other may be made of gold. The semi-conductor body 1 is embedded in an insulating mass, for example, silicon varnish 3. Relatively large-size leads 4 extend through the insulating mass entirely out of contact with the semiconductor body, such leads being connected with the electrodes 2 by means of electrically conductive layers 5 which are suitably provided, for example, by vaporization of electrically conductive material in a high vacuum or by spraying or by chemical, electromechanical or mechanical placement of conductive varnish or by suitable combination of the various possible methods for the placement thereof.

In accordance with a feature of the invention, the semiconductor body 1, including the surfaces of the electrodes, may be initially embedded in insulating material, and the contact surfaces of the electrodes may thereafter be freed of the insulating material at least partially, which may be done in any known and suitable manner, chemically, thermally, electrically or mechanically, followed by the application of the conductive layers 5 which interconnect the leads 4 with the electrodes 2.

Changes may be made within the scope and spirit of the appended claims which define what is believed to be new and desired to have protected by Letters Patent.

I claim:

1. A semiconductor device comprising a semiconductor body, the semiconductor body having a first body portion and a second body portion projecting from a surface of said first body portion and the top surface of the second body portion has a lateral area less than the lateral cross-sectional area of the first body portion, insulating material surrounding the first body portion and the second body portion, except for the top surface thereof, a plurality of electrical terminal conductors extending through said insulating material closely adjacent to but out of electrical contact with said semiconductor body, electrodes for each of said terminal conductors disposed on the top surface of the second body portion of the semiconductor body in spaced relation at the marginal edges thereof, and conducting layers connecting respective conductors to respective electrodes by being disposed upon the overlying portions of the insulating material and extending from respective electrodes to the single ends of the respective conductors which are free of insulating material.

2. A semiconductor device as defined in claim 1 wherein the top surface of the second body portion and the ends of the terminal conductors lie in a common plane.

3. A semiconductor device as defined in claim 2 wherein said insulating material consists of silicon varnish and the conducting layers are formed of a coating which is deposited on the surface of the conductors, the respective electrodes and the insulating material between respective electrodes and conductors.

4. A semiconductor device as defined in claim 1 having a pair of electrodes alloyed into the semiconductor surface, electrically insulating material adjacent said semiconductor surface and said electrodes, two separate layers of electrically conductive material overlying the surface of the insulating material and said conductive layers making respective electrical contact to said electrodes..

References Cited

UNITED STATES PATENTS

| | | | |
|---|---|---|---|
| 2,606,960 | 8/1952 | Little | 317—234 |
| 2,629,802 | 2/1953 | Pantchechnikoff | 317—235 |
| 2,680,220 | 6/1954 | Starr et al. | 317—235 |
| 2,703,855 | 3/1955 | Koch et al. | 317—234 |
| 2,883,592 | 4/1959 | Burton et al. | 317—234 |

OTHER REFERENCES

Modern Plastics Encyclopedia, 1949 edition, page 251, Charles A. Breskin publisher.

JOHN W. HUCKERT, *Primary Examiner.*

A. J. JAMES, *Assistant Examiner.*